(12) United States Patent
Kokott et al.

(10) Patent No.: US 8,973,523 B2
(45) Date of Patent: Mar. 10, 2015

(54) DEVICE FOR CREATING AND CONVEYING A GAS-POWDER MIXTURE

(75) Inventors: Walter Kokott, Rosenheim (DE); Helmut Paul Höll, Waldkraiburg (DE); Peter Richter, Jr., Heldenstein (DE); Peter Richter, Sr., Heldenstein (DE)

(73) Assignee: Oerlikon Metco AG, Wohlen (CH)

( * ) Notice: Subject to any disclaimer, the term of this patent is extended or adjusted under 35 U.S.C. 154(b) by 221 days.

(21) Appl. No.: 13/131,501

(22) PCT Filed: Nov. 19, 2009

(86) PCT No.: PCT/EP2009/008252
§ 371 (c)(1),
(2), (4) Date: Jun. 20, 2011

(87) PCT Pub. No.: WO2010/060567
PCT Pub. Date: Jun. 3, 2010

(65) Prior Publication Data
US 2011/0247555 A1    Oct. 13, 2011

(30) Foreign Application Priority Data

Nov. 27, 2008  (DE) .................. 10 2008 059 334

(51) Int. Cl.
*B05B 7/14*   (2006.01)
*B65G 53/14*  (2006.01)
*B05C 19/00*  (2006.01)
(Continued)

(52) U.S. Cl.
CPC .............. *C23C 24/04* (2013.01); *B05C 19/02* (2013.01); *B05C 19/06* (2013.01); *B05C 19/00* (2013.01); *B05B 7/1404* (2013.01); *B05C 19/008* (2013.01);
(Continued)

(58) Field of Classification Search
USPC .............. 118/308, 312, 317; 406/144, 14, 19, 406/146, 108, 122
See application file for complete search history.

(56) References Cited

U.S. PATENT DOCUMENTS 3,100,724 A    8/1963   Rocheville
3,514,036 A *  5/1970   Smith, Sr. et al. .............. 239/85

(Continued)

FOREIGN PATENT DOCUMENTS

DE        35 90 508       9/1986
DE      10 2004 02185    12/2005
(Continued)

OTHER PUBLICATIONS

International Search Report for PCT/EP2009/008252, mailed Jan. 29, 2010.
Foreign-language Written Opinion of the International Searching Authority for PCT/EP2009/008252, mailed Jan. 29, 2010.

*Primary Examiner* — Dah-Wei D Yuan
*Assistant Examiner* — Binu Thomas
(74) *Attorney, Agent, or Firm* — Greenblum & Bernstein, P.L.C.

(57) ABSTRACT

The invention relates to a device for creating and conveying a gas-powder mixture having a powder receiving space (3) that is connected to a vacuum creation device via a vacuum line (19) that discharges to the upper region of said powder receiving space. A reduced pressure in comparison to a mixing chamber (7) can be created within the powder receiving space (3), and thus a gas flow directed against the powder flow direction within a powder supply channel (6).

7 Claims, 1 Drawing Sheet

(51) Int. Cl.
*B05C 19/06* (2006.01)
*C23C 24/04* (2006.01)
*B05C 19/02* (2006.01)
*B05B 7/16* (2006.01)

(52) U.S. Cl.
CPC .............. *B65G 53/14* (2013.01); *B05B 7/1486* (2013.01); *B05B 7/16* (2013.01)
USPC ............. 118/308; 118/50; 118/716; 406/153; 406/108; 406/144; 427/185; 427/195; 427/191

(56) References Cited

U.S. PATENT DOCUMENTS

| | | | |
|---|---|---|---|
| 3,638,839 A * | 2/1972 | Weightman | 406/85 |
| 4,740,112 A * | 4/1988 | Muehlberger et al. | 406/50 |
| 4,815,414 A | 3/1989 | Duffy et al. | |
| 4,900,199 A * | 2/1990 | Spaulding et al. | 406/14 |
| 5,018,910 A * | 5/1991 | Weiss | 406/144 |
| 7,297,048 B1 * | 11/2007 | Reilley | 451/38 |
| 2007/0160769 A1 | 7/2007 | Maev et al. | |
| 2007/0193646 A1 | 8/2007 | Tapphorn et al. | |

FOREIGN PATENT DOCUMENTS

| | | |
|---|---|---|
| EP | 0 484 533 | 5/1992 |
| EP | 1 462 546 | 9/2004 |
| WO | WO 95/21026 | 8/1995 |
| WO | WO 96/19404 | 6/1996 |
| WO | WO 9619404 A1 * | 6/1996 |

* cited by examiner

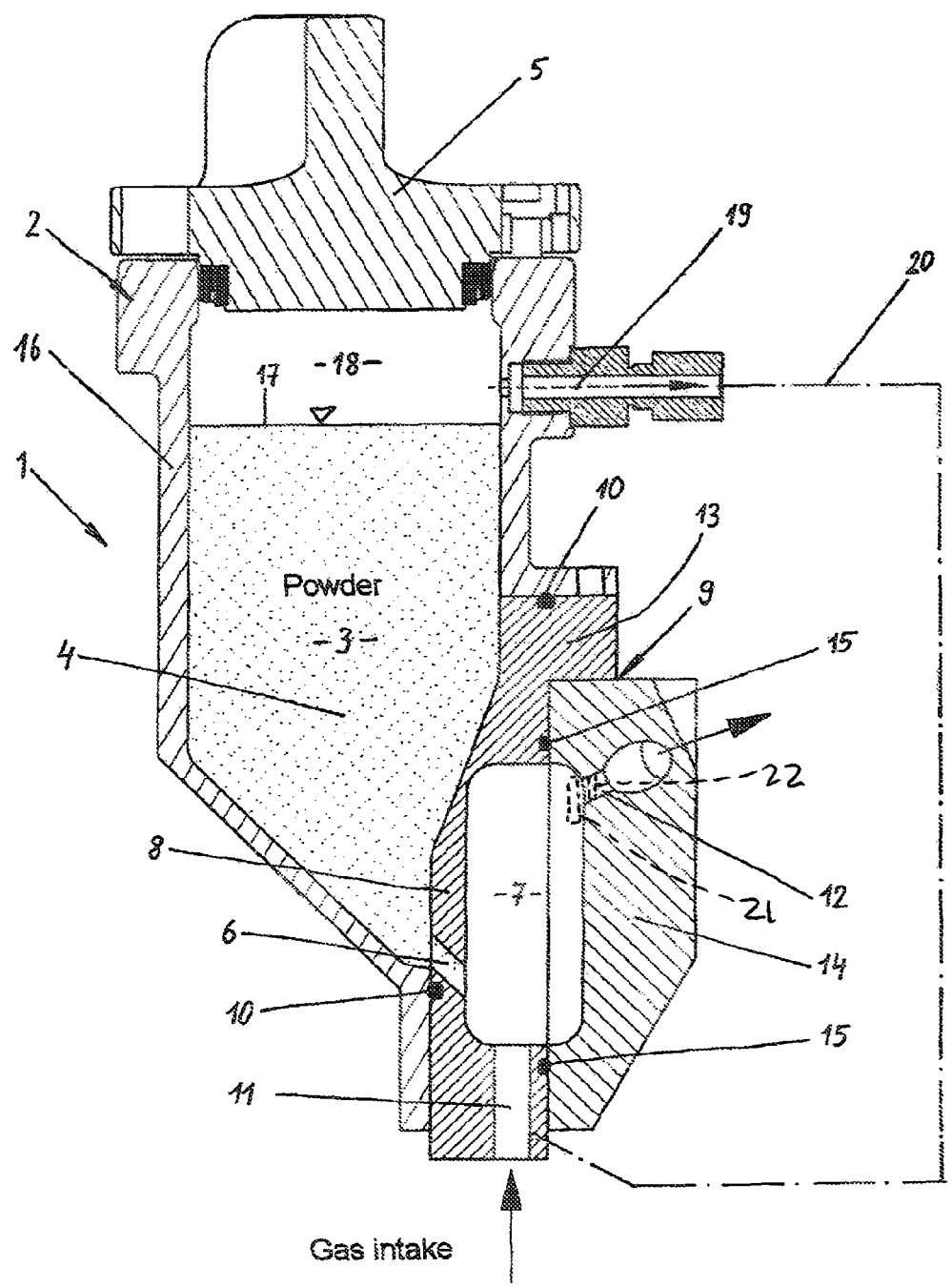

DEVICE FOR CREATING AND CONVEYING A GAS-POWDER MIXTURE

The application is the U.S. national phase of International Application No. PCT/EP2009/008252, filed 19 Nov. 2009, which designated the U.S. and claims priority to German Application No. 10 2008 059 334.6, filed 27 Nov. 2008, the entire contents of each of which are hereby incorporated by reference.

BACKGROUND OF THE INVENTION

1. Field of the Invention

The invention relates to a device for creating and conveying a gas-powder mixture, in particular for coating processes such as cold-gas spraying, at an increased pressure, in accordance with the preamble of claim 1.

2. Discussion of Background Information

As is known, cold-gas spraying is a spraying technique for metals and plastics materials, in which a powdered spraying material consisting of metal, metal alloys or plastics material is sprayed onto a substrate at high speed, in particular supersonic speed, in such a way that because of the high kinetic energy thereof, the powder bonds with the material of the substrate. The gas, preferably nitrogen, is accelerated to supersonic speed by high pressure and by means of a de Laval nozzle (Venturi nozzle).

Heating the gas jet increases the flow speed of the gas and thus also the particle speed. The heating of the particles which also occurs in this connection promotes the deformation thereof on impact. However, in cold-gas spraying the gas temperature is considerably less than the melting point of the spraying material, and so the particles in the gas jet do not melt.

A device of this type is known for example from EP 0 484 533 A1. This document uses a powder container in which a metering drum arranged at the base meters powder into a downstream mixing chamber, into which the gas is introduced at high pressure. Subsequently, the mixture is accelerated to the desired supersonic speed in a supersonic nozzle. The powder container, metering drum and mixing chamber are located in a single housing, where the powder holding chamber is further connected via a gas pressure compensation line to the gas supply line so as to distribute the pressure evenly in the powder holding chamber and in the mixing chamber and to eliminate the effect of pressure on the metering of the powder. However, this known device is of a relatively complicated construction, is expensive to manufacture and has relatively large dimensions.

SUMMARY OF THE INVENTION

The invention provides a device of the type mentioned at the outset which is of as simple a construction as possible and can be manufactured cost-effectively and with relatively small dimensions.

According to the invention, the device includes a powder container having a powder holding chamber for holding a powder, a mixing chamber for mixing gas and powder, a gas supply having a gas supply line for supplying gas at an increased pressure into the mixing chamber, at least one powder supply duct, which is arranged between the powder holding chamber and the mixing chamber, for carrying powder from the powder holding chamber into the mixing chamber, and a mixture outlet line for removing the a gas-powder mixture from the mixing chamber. The powder container includes a vacuum line, which opens into the region of the powder holding chamber and is connected to a vacuum generator, and via which a reduced pressure is generated within the powder holding chamber by comparison with the mixing chamber and a gas flow directed counter to a powder flow direction can thus be generated within the powder supply duct. Advantageous embodiments of the invention are disclosed in the further claims.

In the device according to the invention, the powder container comprises a vacuum line, which opens into the upper region of the powder holding chamber and is connected to a vacuum generator, and via which a reduced pressure is generated within the powder holding chamber by comparison with the mixing chamber and a gas flow directed counter to the powder flow direction can thus be generated within the powder supply duct.

In the powder holding chamber, the relative vacuum generated in the powder holding chamber generates a gas flow, which flows from the mixing chamber through the powder supply duct and through the powder stored in the powder container and is directed counter to the powder supply direction. It has been found that in this way, specific metering device such as metering drums, conveyer wheels etc. between the mixing chamber and the powder holding chamber can be omitted, and the powder can be metered merely by the correspondingly dimensioned powder supply duct (or by a plurality of corresponding powder supply ducts). The rearwardly directed gas flow prevents flow blockages and in particular bridge formation of the powder in or immediately before the powder supply duct, and so a continuous, even powder flow can be achieved even if the powder supply duct has a small diameter. It is also possible for the entire powder supply in the powder container to be loosened up by the rearwardly directed gas flow.

Because according to the invention it is no longer necessary to provide metering devices in the form of metering drums, conveyer wheels etc. between the powder holding chamber and the mixing chamber, the device may be of a simple construction and have small dimensions. It is therefore in particular also suitable for portable use. The complexity of the device is reduced. Further, the device can also be manufactured relatively simply in a cost-effective manner. It has also been found that this makes very reliable powder conveyance possible.

In an advantageous embodiment, the vacuum line is coupled to the gas supply line in such a way that the vacuum is generated by the gas flow in the gas supply line. This embodiment therefore exploits a "sucking jet pump effect" of the gas supplied to the mixing chamber.

Alternatively, it is also possible for the vacuum line to be connected to a vacuum generator which is separated from the gas supply line.

BRIEF DESCRIPTION OF THE DRAWINGS

In the following, the invention is explained by way of example with reference to the drawings. The single FIGURE is a longitudinal section through a device according to the invention.

DETAILED DESCRIPTION OF THE INVENTION

The device shown in FIG. 1 comprises a housing 1 having a powder container 2. The powder container 2 comprises a stable powder container housing 16, in which a powder holding chamber 3 for holding powder 4 is located. The powder 4 may for example consist of metal, metal alloys, plastics materials or other powdered materials and of any desired mixtures.

The powder container 1 can be sealed in a pressure-tight manner on the upper face thereof by a cover 5. When the cover 5 is removed, the powder container 2 can be filled with the powder 4 from above. It is expedient for the cover 5 to be fixed by a flange connection using screws (not shown).

The powder holding chamber 3 converges in a funnel-shape in the lower region thereof, and is connected by the lower end thereof to a mixing chamber 7 via a powder supply duct 6. The mixing chamber 7 is likewise located in the housing 1, adjacent to the lower region of the powder holding chamber 3, from which said chamber is separated by a wall 8. This wall 8 may, as shown, be part of a separate mixing chamber housing 9, which extends through an opening in the powder container housing 16 and seals said housing in a pressure-tight manner using seals 10. In this way, the manufacture of the powder container 2 and the mixing chamber 7 can be simplified. It is further possible to exchange the mixing chamber housing 9, and thus also the powder supply duct 6 arranged in the wall, for a different mixing chamber housing 9 in a simple manner if the type of powder is to be changed and a different diameter of the powder supply duct 6 is required to achieve the desired powder metering.

Pressurised gas, for example nitrogen, is supplied to the mixing chamber 7 via a gas supply line 11. The powder supplied via the powder supply duct 6 mixes with the incoming gas within the mixing chamber 7, where it is swirled around intensively.

The gas-powder mixture formed in the mixing chamber 7 is removed from the mixing chamber 7 via a mixture outlet line 12 and transported to the desired point of use via a further line (not shown). If the device shown is used for a cold-spray coating method for example, the gas-powder mixture exiting the mixing chamber 7 may in particular be supplied to a supersonic nozzle (de Laval or Venturi nozzle) for accelerating the mixture stream and to a heater for heating the mixture, before the mixture is sprayed onto a substrate via a pistol, at high kinetic energy.

In the embodiment shown, the mixing chamber housing 9 is formed in two parts and comprises a mixing chamber base part 13 and a cover part 14. The cover part 14 is connected to the mixing chamber base part 13 in a pressure-tight manner via seals 15, whilst the mixing chamber base part 13 is fastened to the powder container housing 16. The mixture outlet line 12 is located in the cover part 14 on the opposite side from the powder supply duct 6. The gas supply line 11 is located in the mixing chamber base part 13. Alternatively, the mixture outlet line 12 can be located at any desired point around the mixing chamber 7.

The powder 4 is expediently filled in at up to a defined maximum height 17 within the powder container 2. This maximum height 17 is a defined distance below the cover 5, in such a way that there is an empty space 18 in between. A vacuum line 19 which leads to a vacuum generator opens into this empty space 18. A vacuum can thus be produced in the powder holding chamber 3 using the vacuum generator and the vacuum line 19. In this case, a vacuum is understood to mean a relative vacuum by comparison with the pressure prevailing in the mixing chamber 7. For example, if the pressure in the mixing chamber 7 is 20 bar, any pressure which is lower than 20 bar is understood to be a vacuum, even if it is still considerably higher than the ambient pressure. Because of the relative vacuum prevailing in the powder holding chamber 3, gas flows from the mixing chamber 7 through the powder supply duct 6 and from there upwards through the powder 4, loosening up the powder 4 in particular in the powder supply duct 6 and preventing blockage of the powder flow. This provides even, continuous powder flow through the powder supply duct 6 from the powder holding chamber 3 into the mixing chamber 7, even at very small duct diameters.

The vacuum generator can be provided in a simple manner by the vacuum line 19 itself in that said line leads back to the gas supply line 11, as is shown schematically by a dot-dash line 20, and opens into the gas supply line 11 in such a way that the gas flow generates a relative vacuum in the vacuum line 19 in the manner of a water jet pump.

A metering device 21, 22 in the form of a metering plate, metering screw, conveyer wheel etc. can readily be provided at the output of the mixing chamber 7, i.e., immediately before the mixture outlet line 12 or within the mixture outlet line 12, for controlling the amount of the gas-powder mixture flowing off. In this case, a metering device of this type is expediently attached to the cover part 14 of the mixing chamber housing 9. Dividing the mixing chamber housing 9 in two, into a mixing chamber base part 13 and the cover part 14, makes this possible simply by exchanging the cover part 14.

The disclosed device can be used not only for coating methods such as cold-gas spraying, but also in many methods in which a gas flow is mixed with a powder. For example, the device can also be used in thermal spraying methods (for example gas-flame spraying methods, plasma coating methods etc.) in which the supplied powder particles are melted in the gas flow. Further, the device according to the invention can also be applied for conveying any other desired powdered substances using a gas flow, for example in the food industry. Further, a plurality of powder containers 2, each connected to the mixing chamber 7 by separate powder supply ducts, can readily be provided instead of only one.

The invention claimed is:

1. A device for creating and conveying a gas-powder mixture at an increased pressure, comprising:
    a powder container comprising a powder holding chamber structured and arranged for holding a powder and a vacuum line opening into a region of the powder holding chamber;
    a mixing chamber structured and arranged for mixing gas and powder;
    a gas supply line structured and arranged to supply gas at an increased pressure into the mixing chamber;
    at least one powder supply duct arranged between the powder holding chamber and the mixing chamber to carry the powder from the powder holding chamber into the mixing chamber; and
    a mixture outlet line structured and arranged for removing a gas-powder mixture from the mixing chamber,
    wherein the vacuum line is directly connected to the gas supply line so that the gas flowing in the gas supply line generates a reduced pressure within the powder holding chamber relative to a pressure in the mixing chamber to generate within the powder supply duct a gas flow directed counter to a powder flow direction.

2. The device according to claim 1, wherein the powder holding chamber and the mixing chamber are located in a multi-part housing comprising a powder container housing and a mixing chamber housing.

3. The device according to claim 2, wherein the mixing chamber housing comprises a plurality of parts including a mixing chamber base part and a mixing chamber cover part.

4. The device according to claim 1, wherein a metering device structured and arranged for a metered release of the gas-powder mixture from the mixing chamber is arranged one of immediately before or within the mixture outlet line.

5. The device according to claim 4, wherein the metering device is arranged in the mixing chamber cover part.

6. The device according to claim 1, wherein the gas-powder mixture is created and is structured to be conveyed through the device for coating processes.

7. The device according to claim 1, being structured and arranged to perform a cold-gas spraying coating process.

\* \* \* \* \*